Jan. 28, 1941.  J. O. HEINZE  2,229,922
WHEEL BRAKE CONSTRUCTION
Filed June 19, 1939  2 Sheets-Sheet 1
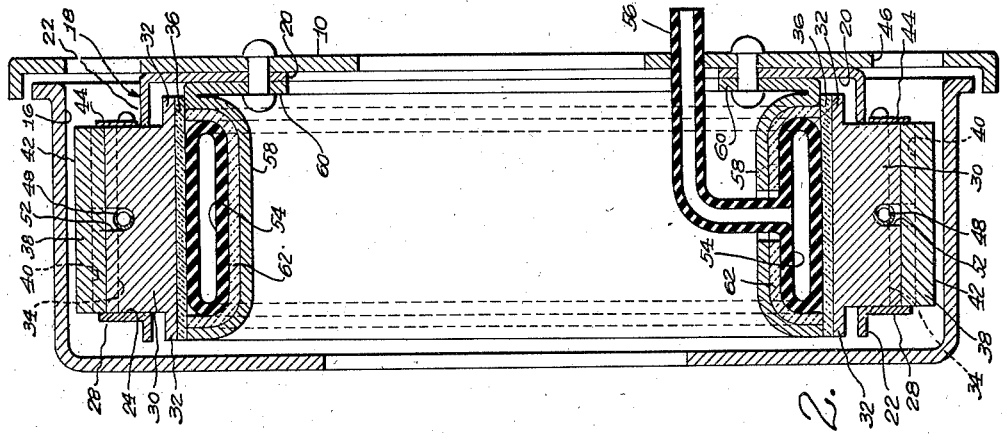
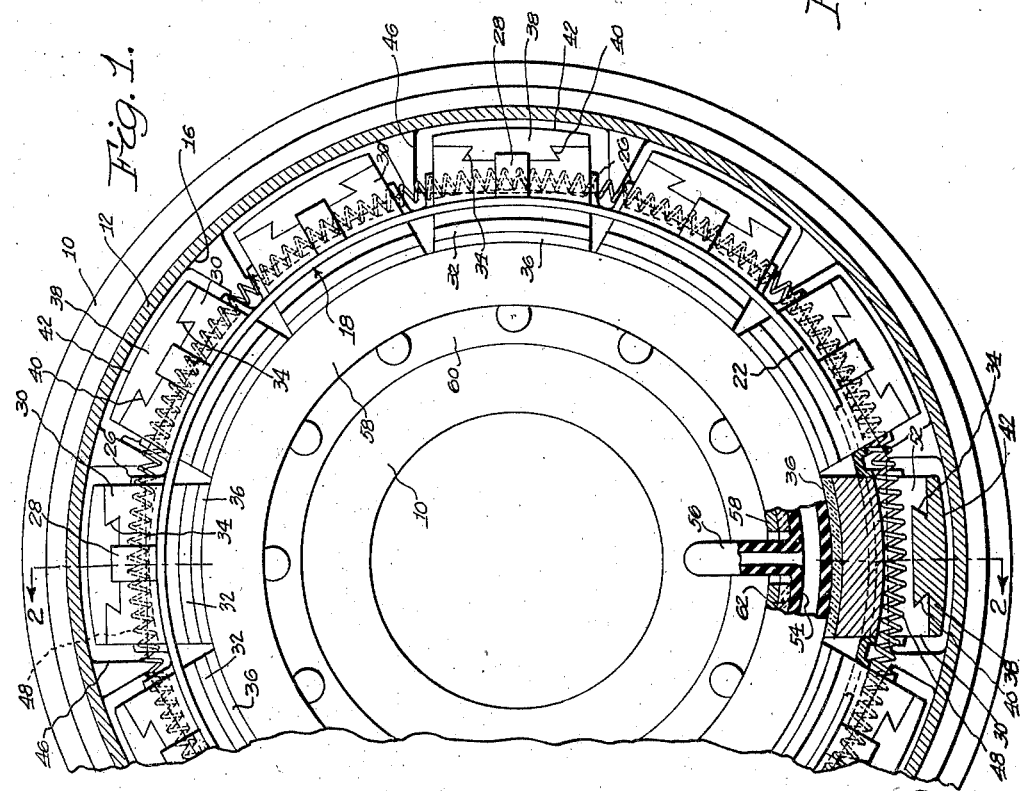
Inventor
John O. Heinze
By
Attorney Jan. 28, 1941.   J. O. HEINZE   2,229,922
WHEEL BRAKE CONSTRUCTION
Filed June 19, 1939   2 Sheets-Sheet 2

Inventor
John O. Heinze,
By
Attorneys

Patented Jan. 28, 1941

2,229,922

UNITED STATES PATENT OFFICE 2,229,922

WHEEL BRAKE CONSTRUCTION

John O. Heinze, Detroit, Mich., assignor to Frederick J. Fisher, trustee, Detroit, Mich.

Application June 19, 1939, Serial No. 279,778

11 Claims. (Cl. 188—152)

This invention relates, in general, to vehicle brakes and, in particular, to a new and improved construction thereof.

One of the objects of the present invention is to provide a new and improved wheel brake for vehicles which is simpler in construction and easier and more efficient in operation than heretofore.

Another object is to provide a new and improved wheel brake which requires little or no attention, repair or adjustment for the maintenance of maximum braking efficiency.

Another object is to maximize the utility and efficiency of a wheel brake by obviating the faults existent in brakes at present in use or otherwise known.

Another object is to increase the efficiency of a wheel brake by insuring the distribution of pressure equally and uniformly throughout the entire area of the braking surfaces.

Another object is to provide a new and improved wheel brake construction wherein the piston or actuator usually employed for moving the brake shoe into engagement with the brake drum has been reconstructed, re-designed and re-positioned so that the pressure upon brake application is exerted radially against the drum and uniformly over the entire 360° arc thereof.

Another object is to improve a wheel brake construction so that the replacement of worn-out shoes with new shoes may be accomplished more easily and quickly than heretofore.

Another object is to minimize the number of parts necessary in a wheel brake assembly while enhancing the operating efficiency of the latter.

Other objects and advantages of the invention will become readily apparent from a reference to the following specification taken in conjunction with the accompanying drawings of which there are two (2) sheets and wherein:

Figure 1 is an elevational view of a wheel brake and showing some of the parts thereof in section to illustrate more clearly the details of their construction;

Fig. 2 is a section taken along the lines 2—2 in Fig. 1;

Figure 4:
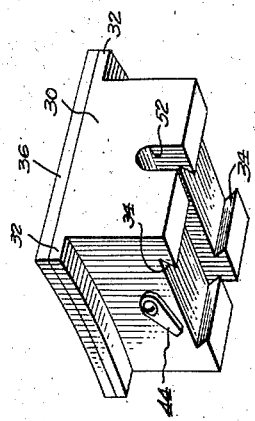
Fig. 4 is a perspective view of one of the plurality of shoe-supporting blocks employed in the brake of Figs. 1, 2 and 3.
Figure 5:
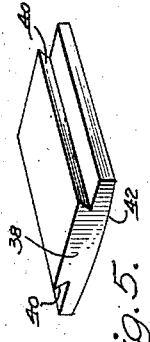
Fig. 5 is a perspective view of the shoe which is operable for being carried by the block of Fig. 4.
Figure 6:
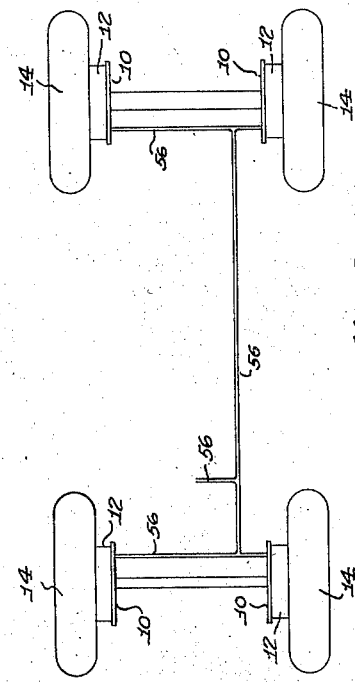
Fig. 6 is a diagrammatic view of one of the many vehicles in which the invention might be incorporated and showing diagrammatically said incorporation.
Figure 3:
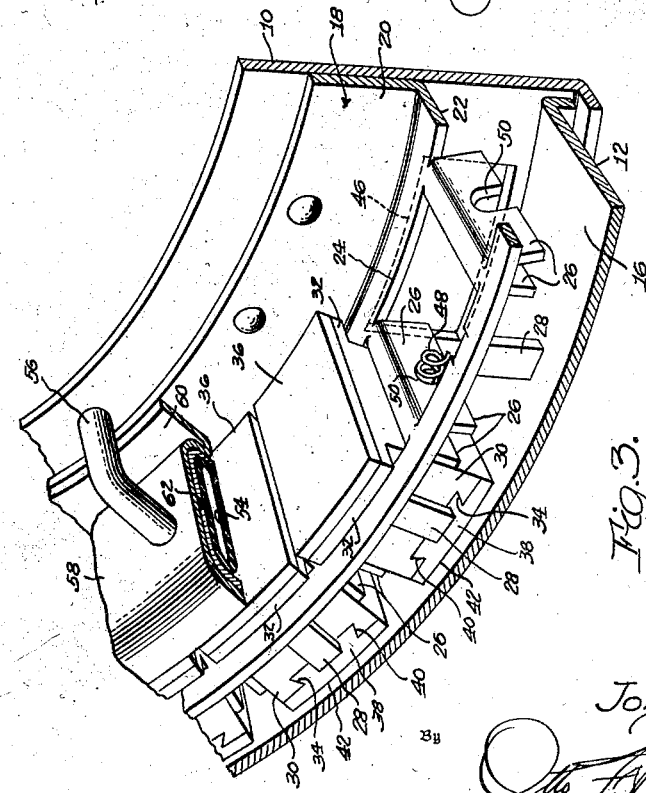
Fig. 3 is a fragmentary view, in perspective, of the wheel brake assembly.

The wheel brake construction which is disclosed and described herein comprises, in general, the usual annular brake support 10 and the usual brake drum 12, said support being non-rotatably mounted in the usual manner to the vehicle coaxially with the wheel 14 to be braked, and said drum being integral and rotatable with said wheel in adjacency to and coaxial with said support, said drum being formed internally, purely for the purpose of illustration, with a cylindrical braking surface 16 coaxial with said support. The support 10 and drum 12, without interfering with or defeating the purposes and intended results of the invention which is to be described, may constitute the support and drum of a vehicle at present in use or of a vehicle to be manufactured in the future, thus rendering the brake adaptable for a new or used vehicle.

The brake assembly employs a plurality of annularly spaced, radially movable brake shoes and a member, such as a block, for supporting individually each of said shoes, which shoes and blocks are to be described presently, and for supporting the block-shoe units there is employed a block support or spider, generally indicated at 18. The spider 18 comprises a plate 20 which is annular for the same reason the brake support 10 is annular and is surfaced for welded, riveted or otherwise fixed, coaxial engagement with said support. The plate 20, intermediate its inner and outer circumferences, is integrally provided with an annular, axially directed flange 22 which, in the brake assembly, is concentric and parallel with and radially inward of the braking surface 16 of the drum 12. The flanged portion 22 of the plate 20, at preferably regularly spaced intervals, is provided with openings 24 each of which openings is multi-sided. From the pair of circumferentially spaced sides of each of the openings 24 there is outwardly directed a pair of parallel walls 26, and from that one of the two axially spaced sides of each of said openings which is more remote from the support 10 of the assembled brake there is outwardly directed a wall 28, the two walls 26 and the one wall 28 of each opening 24 being at their inner ends integral with the flanged portion 22 of the plate 20 and at their outer ends in spaced relation to the braking surface 16, and the central axes of the openings 24 being radial and converging at the central axis of the spider 18.

Carried in each of the openings 24 between its walls 26 and 28 for being guided thereby is a shoe-supporting block 30 which is dimensioned in cross section as closely as is reasonable to the area between said walls but still allowing for radial movement of said blocks with respect to the spider 18. The radially inner and outer ends of each of the blocks 30 are concentrically curved in a circumferential direction about the axis of wheel rotation, said inner ends each being integrally formed with a pair of oppositely disposed, axially directed flanges 32 for cooperation under abnormal conditions with the portions of the flange 22 on axially opposite sides of the respective opening 24, and each of said outer ends being centrally formed with an axially directed dove-tail slot 34. For the purpose of thermally insulating the radially inner ends of the blocks 30, which is preferable for reasons which will presently appear, each of said blocks at said end has bonded or otherwise secured thereto a slab 36 of insulating material of any well known or desired constituency and of an area preferably similar to that of said block end, the radially inner faces of said slabs, at one position or another of the brake, defining a true, though broken, cylindrical surface coaxial with the brake.

Whereas the radially inner ends of the blocks 30 fixedly carry the insulating slabs 36, the radially outer ends, which are formed with the dove-tail slots 34, removably carry segmental brake shoes 38, one shoe per block and each shoe being preferably of the usual brake lining material. Each of the shoes 38 is formed at its radially inner end with a dove-tail section 40 directed in an axial direction and cooperable with the slot 34 of its respective block 30 for holding the shoe and block together as a unit and yet permitting slidability therebetween for removal of the shoe from the block and replacement of a new shoe, and at its radially outer end with a braking surface 42 curved about the axis of wheel rotation and cooperable with the drum surface 16. In the brake assembly, each of the shoes 38 is operable for abutting at one of its axial ends the wall 28 of the opening 24 in which its respective block 30 is carried and to be held in abutment with said wall by means of a locking pin 44 or similar device carried by said block and movable into and out of alignment with the slot 34 at the opposite axial end of said shoe. It is clear that the walls 28 of the openings 24 prevent movement of the shoes 38 in either axial direction therepast, so, in order that the shoes may be assembled upon or disassembled from the blocks, when the pins 44 are out of alignment with the slots 34 and, therefore, out of engagement with the shoes, there is provided a plurality of openings 46 in the brake support 10 opposite the normal position for the shoes through which the latter may pass relatively to the slots 34 in the event of needed repair or replacement.

It will be noted in the figures that the over-all radial distance between the inner face of the flange 22 of the non-rotatable spider 18 and the braking surface 16 of the rotatable drum 12 is less than the over-all radial distance between the outer face of any of the flanges 32 of any of the radially movable blocks 30 and the braking surface 42 of any of the assembled block-shoe units so that the wearing of the shoes 38 will not interrupt or prevent proper braking action. For automatically and resiliently maintaining the shoes 38 and drum 12 out of contact during brake inaction, there is provided an endless, annularly formed coil spring 48 which encircles the spider 18 and fits into grooves 50 and 52 provided therefor in the walls 26 and blocks 30, respectively, the spring thereby constantly urging the block-shoe units radially inwardly from the braking surface 16, the grooves in the blocks being deep enough so as to cause no interference between shoe and spring or with the slidability between shoe and block.

The actuation of the block-shoe units 30—38 radially outwardly against the force of the spring 48 is accomplished through the agency of an annular, expansible tube or duct 54, there being one of said tubes or ducts per wheel 14 and all being inter-communicated by means of a fluid conduit 56 connected in the usual manner to the usual fluid supply (not shown) and to the usual source of manual power (not shown). Each tube or duct 54 is arranged concentrically with respect to and radially inwardly of the block-shoe units 30—38 of the particular wheel brake for which it is adapted, said tube or duct preferably being substantially rectangular in cross section to contact a major portion of the total area of the inner faces of the insulating slabs 36, and said tube or duct being confined and maintained in said contact position, during brake inactivity as well as during brake activity, by means of an annular, rigid casing 58 which is flanged, as at 60, and welded, riveted or otherwise rigidly secured thereat to the spider 18 and support 10. The casing 58 surrounds the tube or duct 54 except where the latter contacts the slabs 36, whereat the former is open to allow for the radial expansion of said tube or duct, the walls of said casing which define the opening cooperating with said slabs to provide a stop for limiting the inner movement of the block-shoe units 30—38 away from the braking surface 16 relatively to the non-rotatable spider 18. Since the surrounding casing 58 is rigid, the expansion of the tube or duct 54, upon application of the brake-applying means, is exclusively radial and uniform throughout the entire annulus thereof, the necessity for adjustments, periodic attention and other corrective measures being, therefore, obviated.

Obviously the only places in the fluid system where expansion is desired are actually at the block-shoe units 30—38 so that, if the conduit 56 connecting the various tubes or ducts 54 to the fluid and power sources is flexible, either in part, as shown, or in toto, for reasons of economy, tighter connections or whatnot, such flexible portions should be encased within inflexible casings though same are not shown herein because of the obvious requirement therefor. This conduit 56 enters each wheel brake in any well known manner, such as through openings provided therefor in the non-rotatable brake support 10 and casing 58 thereof.

For preventing the transmission of heat through the blocks 30 to the tube or duct 54 in each brake unit, said blocks are provided, as has been described, with the insulating slabs 36 which are disposed between said blocks and said tube or duct. For further preventing the transmission of heat, in this case through the spider 18 and flange 60 and thence through the casing 58 to the tube or duct 54, said casing is lined with an annular, channeled insulating member 62 which is shaped complementarily to the tube-confining portion of said casing and confined between the latter and said tube or duct.

Although the invention has been described with some detail it is not intended that such description is to be definitive of the limits of the inventive idea. The right is reserved to make such changes in the details of construction and arrangement of parts as will come within the purview of the attached claims.

What I claim is:

1. In a wheel brake assembly having a brake drum mounted for movement about an axis of rotation and having a braking surface coaxial therewith, a non-rotatable support concentrically mounted with respect to the braking surface, a plurality of annularly spaced openings formed in said support with the axes thereof normal to the braking surface, a plurality of annularly spaced brake shoes each carried within one of said openings and being radially movable relatively to said support into and out of engagement with the braking surface, an annular spring coupling said shoes and normally urging same as a unit radially from the braking surface, an expansible member concentrically arranged with respect to said shoes for radially moving the latter into engagement with the braking surface, and means for expanding said member.

2. In a wheel brake assembly having a brake drum mounted for movement about an axis of rotation and having a braking surface coaxial therewith, a non-rotatable support concentrically mounted with respect to the braking surface, a plurality of annularly spaced openings formed in said support with the axes thereof normal to the braking surface, a plurality of annularly spaced brake shoes each carried within one of said openings and being radially movable relatively to said support into and out of engagement with the braking surface, an annular, expansible member concentrically arranged with respect to and in contact with said shoes for moving the latter into engagement with the braking surface, means for expanding said member, means for limiting the expansion of said member to a radial expansion, said last mentioned means also providing a stop for the radial movement of said shoes away from the braking surface.

3. In a wheel brake, a shoe-supporting spider comprising, an annular plate non-rotatably supported about the axis of wheel rotation, a series of annularly spaced openings in said plate for accommodating in each a radially movable brake shoe, radially directed flanges integrally formed on said plate about each of said openings for guiding the shoe therein in its radial movement, and circumferentially aligned grooves in said flanges for supporting an annular, shoe-encircling spring whereby the shoes are urged as a unit radially inwardly relatively to said flanges.

4. In a wheel brake, a shoe-supporting spider comprising, an annular plate non-rotatably supported about the axis of wheel rotation, a series of annularly spaced openings in said plate for accommodating in each a radially movable brake shoe, radially directed flanges integrally formed on said plate about each of said openings for guiding the shoe therein in its radial movement, circumferentially aligned grooves in said flanges for supporting an annular, shoe-encircling spring whereby the shoes are urged as a unit radially inwardly relatively to said flanges, and expansible means engageable with and carried radially inwardly of the shoes for moving the latter radially outwardly in opposition to the spring.

5. A wheel brake assembly comprising, a brake drum having a braking surface rotatable about the axis of wheel rotation, a non-rotatable brake support adjacent said drum, a spider fixedly mounted on said support and having a flanged portion concentrically arranged radially within said braking surface, a series of annularly spaced openings formed in said flanged portion and having radially extending central axes, a brake shoe unit carried in each of said openings and radially movable along the axis of the respective opening, each of said units having a removable lining element, means interconnecting said units for normally urging same radially inwardly from said braking surface, means expansible radially outwardly against said units in opposition to said first means for inter-engaging said braking surface and said units, and an opening in said brake support opposite the normal radial position of each of said units for providing access to the lining element thereof.

6. In a wheel brake having a rotatable brake drum provided with an annular braking surface, a brake support comprising, a non-rotatable supporting member, a second non-rotatable supporting member having a portion fixedly secured to said first member and an integral, annular flanged portion extending in parallelism with the braking surface and concentrically with respect thereto, a plurality of annularly spaced, shoe-receiving openings in said flanged portion, and a plurality of walls integrally formed on said flanged portion about said openings and extending radially outwardly from said flanged portion toward the braking surface to provide guide means for the shoes received in said openings.

7. In a wheel brake having a rotatable brake drum provided with an annular braking surface, a brake support comprising, a non-rotatable supporting member, a second non-rotatable supporting member having a portion fixedly secured to said first member and an integral, annular flanged portion extending in parallelism with the braking surface and concentrically with respect thereto, a plurality of annularly spaced, shoe-receiving openings in said flanged portion, a plurality of walls integrally formed on said flanged portion about said openings and extending radially therefrom toward the braking surface to provide guide means for the shoes received in said openings, and grooves formed in said walls for supporting an annular, shoe-encircling spring whereby the shoes are unitarily urged radially away from the braking surface relatively to said walls.

8. In a wheel brake having a rotatable brake drum provided with an annular braking surface, a brake support comprising, a non-rotatable supporting member, a second non-rotatable supporting member having a portion fixedly secured to said first member and an integral, annular flanged portion extending in parallelism with the braking surface and concentrically with respect thereto, a plurality of annularly spaced, shoe-receiving openings in said flanged portion, a plurality of walls integrally formed on said flanged portion about said openings and extending therefrom toward the braking surface to provide guide means for the shoes received in said openings, grooves formed in said walls for supporting an annular, shoe-encircling spring whereby the shoes are unitarily urged radially away from the braking surface relatively to said walls, and expansible means engageable with the shoes for radially moving the latter toward the braking surface in opposition to said spring.

9. In a wheel brake having a rotatable brake drum provided with an annular braking surface, a brake support comprising, a non-rotatable supporting member, a second non-rotatable supporting member having a portion fixedly secured to said first member and an integral, annular flanged portion extending in parallelism with the braking surface and concentrically with respect thereto, a plurality of annularly spaced, shoe-receiving openings in said flanged portion, a plurality of walls integrally formed on said flanged portion about said openings and extending radially outwardly from said flanged portion toward the braking surface to provide guide means for the shoes received in said openings, and an opening in said first supporting member between said flanged portion and the braking surface for providing access to the shoes.

10. In a wheel brake having a rotatable brake drum provided with an annular braking surface, a brake support comprising, a non-rotatable supporting member, a second non-rotatable supporting member having a portion fixedly secured to said first member and an integral, annular flanged portion extending in parallelism with the braking surface and concentrically with respect thereto, a plurality of annularly spaced, shoe-receiving openings in said flanged portion, a plurality of walls integrally formed on said flanged portion about said openings and extending radially therefrom toward the braking surface to provide guide means for the shoes received in said openings, grooves formed in said walls for supporting an annular, shoe-encircling spring whereby the shoes are unitarily urged radially away from the braking surface relatively to said walls, and an opening in said first supporting member between said flanged portion and the braking surface for providing access to the shoes.

11. In a wheel brake having a rotatable brake drum provided with an annular braking surface, a brake support comprising, a non-rotatable supporting member, a second non-rotatable supporting member having a portion fixedly secured to said first member and an integral, annular flanged portion extending in parallelism with the braking surface and concentrically with respect thereto, a plurality of annularly spaced, shoe-receiving openings in said flanged portion, a plurality of walls integrally formed on said flanged portion about said openings and extending radially therefrom toward the braking surface to provide guide means for the shoes received in said openings, grooves formed in said walls for supporting an annular, shoe-encircling spring whereby the shoes are unitarily urged radially away from the braking surface relatively to said walls, expansible means engageable with the shoes for radially moving the latter toward the braking surface in opposition to said spring, and an opening in said first supporting member between said flanged portion and the braking surface for providing access to the shoes.

JOHN O. HEINZE.